United States Patent
Dobkin et al.

(10) Patent No.: US 8,502,473 B2
(45) Date of Patent: Aug. 6, 2013

(54) SYSTEM AND METHOD FOR ILLUMINATING A COMPONENT OF AN ELECTRONIC DEVICE

(75) Inventors: Randall J. Dobkin, Boca Raton, FL (US); Darcy Phipps, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 231 days.

(21) Appl. No.: 13/032,382

(22) Filed: Feb. 22, 2011

(65) Prior Publication Data
US 2011/0260628 A1    Oct. 27, 2011

Related U.S. Application Data

(60) Provisional application No. 61/327,890, filed on Apr. 26, 2010.

(51) Int. Cl.
*G05F 1/00*     (2006.01)
(52) U.S. Cl.
USPC .......................... 315/307; 315/291; 315/312
(58) Field of Classification Search
USPC ............ 315/185 R, 192, 291, 292, 294, 297, 315/306, 307, 308, 312
See application file for complete search history.

(56) References Cited

U.S. PATENT DOCUMENTS

| | | | |
|---|---|---|---|
| 6,674,854 B1 | 1/2004 | Kawano et al. | |
| 6,812,649 B2 | 11/2004 | Kim | |
| 6,959,208 B2 * | 10/2005 | Tanaka et al. | 455/567 |
| 7,655,889 B2 | 2/2010 | Nakamura et al. | |
| 8,068,125 B2 * | 11/2011 | Pantfoerder | 345/690 |
| 8,126,513 B2 * | 2/2012 | Yoshida et al. | 455/566 |
| 2005/0041139 A1 * | 2/2005 | Lowles | 348/362 |
| 2005/0225983 A1 | 10/2005 | Fornell | |
| 2010/0156865 A1 | 6/2010 | Kreek et al. | |

FOREIGN PATENT DOCUMENTS

| | | |
|---|---|---|
| EP | 1 505 567 A1 | 2/2005 |
| GB | 2 391 752 A | 2/2004 |
| WO | WO 2007/051288 A1 | 5/2007 |

* cited by examiner

*Primary Examiner* — Douglas W Owens
*Assistant Examiner* — Jianzi Chen
(74) *Attorney, Agent, or Firm* — McCarthy Tétrault LLP

(57) ABSTRACT

The disclosure describes a system and method for controlling a light for a component of an electronic device. An embodiment uses brightness evaluation zones and progresses through one or more of the zones to determine whether and when to activate the light for given conditions of ambient light. In doing so, the embodiment sets a current brightness evaluation zone for the device and sets an activation status of the light level to an activation value associated with the current brightness evaluation zone. The embodiment compares an ambient light level for the device to the current brightness evaluation zone. Evaluation loops are provided to test and change the current brightness evaluation zone against the detected ambient light. The light may be a backlight.

19 Claims, 5 Drawing Sheets

SYSTEM AND METHOD FOR ILLUMINATING A COMPONENT OF AN ELECTRONIC DEVICE

RELATED APPLICATION

This application claims priority from U.S. Provisional Patent Application Ser. No. 61/327,890 filed Apr. 26, 2010.

FIELD OF TECHNOLOGY

The disclosure described herein relates to a system and method for illuminating a component on an electronic device. In particular, the disclosure described herein relates to controlling a backlight for a keypad having one or more keys of an electronic device having regard to ambient lighting conditions.

BACKGROUND

Current wireless handheld mobile communication devices perform a variety of functions to enable mobile users to stay up-to-date with information and communications, such as e-mail, corporate data and organizer information while they are away from their desks. A wireless connection to a server allows a mobile communication device to receive updates to previously received information and communications. The handheld devices optimally are lightweight, compact and have long battery life.

External components of a mobile device may be backlit, including a display and one or more keys. Prior art backlight systems for a key leave the key's backlight activated in environments where it is not useful. This can cause over-use of the backlight system, thereby drawing excessive battery power from the device.

There is a need for a system and method which addresses one or more of the deficiencies in the prior art.

BRIEF DESCRIPTION OF THE DRAWINGS

The disclosure and its embodiments will now be described, by way of example only, with reference to the accompanying drawings, in which.

DESCRIPTION OF EMBODIMENTS

Figure 1:
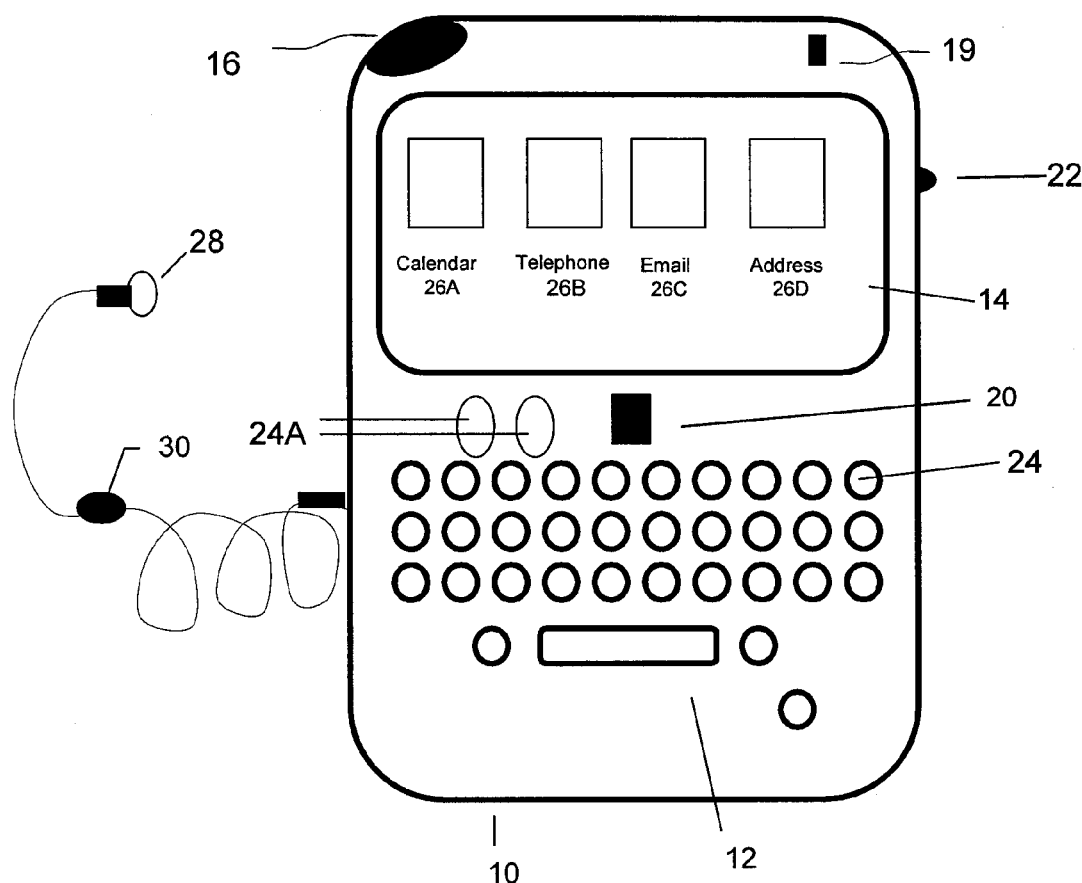
FIG. 1 is a schematic representation of an electronic device, a key and a backlight adjustment system for a component of the device in accordance with an embodiment.

The description which follows and the embodiments described therein are provided by way of illustration of an example or examples of particular embodiments of the principles of the present disclosure. These examples are provided for the purposes of explanation and not limitation of those principles and of the disclosure. In the description which follows, like parts are marked throughout the specification and the drawings with the same respective reference numerals.

In a first aspect, a method of controlling a light for a component of an electronic device is provided. The method comprises: defining a plurality of brightness evaluation zones within a scale of brightness levels for the device; defining an activation status for the light for each brightness evaluation zone of the plurality of brightness evaluation zones; and evaluating detected ambient light around the device against a progression of zones in the plurality of brightness evaluation zones until the detected ambient light is in within one zone of the progression of zones. When the detected light is within one zone, then if the activation status for the one zone indicates that the light is not to be activated, then deactivating the light; if the activation status for the light for the one zone indicates that the light is to be activated, then determining whether a further zone of the plurality of zones exists in the progression, and if the further zone exists then the activation status is set to the activation status of the further zone and the detected ambient light is re-evaluated to determine if it is or is not within the range of further zone, otherwise activating the light.

In a second aspect, a system for controlling a light for a component of an electronic device is provided. The system comprises a module providing instructions for a microprocessor for the device to: define a plurality of brightness evaluation zones within a scale of brightness levels for the device; define an activation status for the light for each brightness evaluation zone of the plurality of brightness evaluation zones; and evaluate detected ambient light around the device against a progression of zones in the plurality of brightness evaluation zones until the detected ambient light is in within one zone of the progression of zones. If the activation status for the one zone indicates that the light is not to be activated, then the light is deactivated; if the activation status for the light for the one zone indicates that the light is to be activated, then the system determines whether a further zone of the plurality of zones exists in the progression, and if the further zone exists then set the activation status to the activation status of the further zone and the detected ambient light is re-evaluated to determine if it is or is not within the range of further zone, otherwise the system activates the light.

In another aspect, a method of illuminating a component of an electronic device is provided. In particular, the method relates to controlling a light for a component of an electronic device. The light may be a backlight. The method comprises: for the device setting a current brightness evaluation zone to a first brightness evaluation zone of a plurality of brightness evaluation zones; setting an activation status of the backlight level to an activation value associated with the current brightness evaluation zone; comparing an ambient light level for the device to the brightness range associated with the current brightness evaluation zone; evaluating the ambient light level against the current and successive brightness evaluation zones in the plurality of brightness evaluation zones to identify a brightness evaluation zone with a range encompassing the ambient light level; and setting an activation status for the backlight to an activation value associated with the identified brightness evaluation zone.

In the method, upon setting the activation status for the backlight to the activation value associated with the given brightness evaluation zone, if the activation status of the current brightness evaluation zone is to activate the backlight, then the method may change the current brightness evaluation zone to the subsequent brightness evaluation zone and re-evaluates whether the ambient light level is or is not within the brightness range of the subsequent brightness evaluation zone. Further, if the activation status of the current brightness evaluation zone is not to activate the backlight, then the method may change the activation status to the activation value of the current brightness evaluation zone.

In the method, upon changing the activation status to the activation value of the current brightness evaluation zone, the method may activate (which includes deactivating) the backlight according to the activation value.

In the method, upon changing the activation status to the activation value of the current brightness evaluation zone, the method may determine a level of activation for the backlight according to the ambient light level.

In another aspect, another method of illuminating a component of an electronic device is provided. In particular, the method relates to controlling a light for a component of an electronic device. The light may be a backlight. The method comprises: for the device, setting a current brightness evaluation zone to a first brightness evaluation zone of a plurality of brightness evaluation zones; setting an activation status of the backlight level to an activation value associated with the current brightness evaluation zone; and comparing an ambient light level for the device to the brightness range associated with the current brightness evaluation zone. If the ambient light level is not within the range, then if a subsequent brightness evaluation zone to the current brightness evaluation zone in the plurality of brightness evaluation zones exists, then the method changes the current brightness evaluation zone to the subsequent brightness evaluation zone, changes the activation status to an activation value associated with the subsequent brightness evaluation zone and re-evaluates whether the ambient light level is or is not within the range of the subsequent brightness evaluation zone. If a subsequent brightness evaluation zone does not exist, then the method activates or deactivates the backlight according to the activation status the current brightness evaluation zone. For an exemplary case where the backlight is either just on or off, there are four possible progressions: a) the backlight is initially off and the method leaves it off; b) the backlight is initially off and the method activates it; c) the backlight is initially on and the method deactivates it; and d) the backlight is initially on and the method leaves it on. This algorithm chooses a target zone and a subsequent algorithm can be used to determine what actions are necessary to set the backlight (or leave it unchanged) for the zone. If the ambient light level is within the predetermined range, then the following tests are made. If the activation status of the current brightness evaluation zone is to activate the backlight, then if the subsequent brightness evaluation zone exists, then the method changes the current brightness evaluation zone to the subsequent brightness evaluation zone, changes the activation status to the activation value associated with the subsequent brightness evaluation zone and re-evaluates whether the ambient light level is or is not within the brightness range of the subsequent brightness evaluation zone. If the subsequent brightness evaluation zone does not exist, then the method activates the backlight according to the activation level of the current brightness evaluation level. If the activation status of the current brightness evaluation zone is not to activate the backlight, then the method deactivates the backlight.

In the method, the first brightness evaluation zone may be the brightest zone; and the subsequent brightness evaluation zone may be a next brightest zone to the first brightness evaluation zone.

In the method, at least two brightness evaluation zones may be provided.

In the method, the component may be a key cap for a key.

In the method, the backlight for the key cap may be controlled separately from a backlight for a display for the device.

In the method, one brightness evaluation zone may have an upper lux value of between approximately 50 and 300 lux and may have an activation status for the backlight as "on". An overlapping brightness evaluation zone to the one brightness evaluation zone may have a lower lux value of less than the upper lux value of the one brightness evaluation zone and may have an activation status for the backlight as "off".

In the method, one brightness evaluation zone may have a lower lux value of between approximately 30 and 150 lux and may have an activation status for the backlight as "off". An overlapping brightness evaluation zone to the one brightness evaluation zone may have an upper lux value of more than the lower lux value of the one brightness evaluation zone and may have an activation status for the backlight as "on".

In the method, the first brightness evaluation zone may be the dimmest zone in the plurality of brightness evaluation zones; and the subsequent brightness evaluation zone may be a next brighter zone to the first brightness evaluation zone.

In the method, upon changing the activation status to the activation value of the current brightness evaluation zone, the method may activate the backlight according to the activation value.

The method may be repeated upon detection of a change in the ambient light level past a threshold or an activation of a backlight for a display of the device.

In another aspect, a system for illuminating a component of an electronic device is provided. The system comprises a module providing instructions for a microprocessor for the device. The instructions provide commands executed by the microprocessor to: set a current brightness evaluation zone to a first brightness evaluation zone of a plurality of brightness evaluation zones; set an activation status of the backlight level to an activation value associated with the current brightness evaluation zone; compare an ambient light level for the device to a brightness value associated with the current brightness evaluation zone; change the current brightness evaluation zone to a subsequent brightness evaluation zone in the plurality of brightness evaluation zones, change the activation status of a light level to an activation value associated with the subsequent brightness evaluation zone and re-evaluate whether the ambient light level is or is not within the brightness range of the subsequent brightness evaluation zone when the subsequent brightness evaluation zone exists and the ambient light level is not within the range; change the current brightness evaluation zone to the subsequent brightness evaluation zone, change the activation status of the light level to the activation value associated with the subsequent brightness evaluation zone and re-evaluate whether the ambient light level is or is not within the brightness range of the subsequent brightness evaluation zone when both the ambient light level is within the range and the activation status of the current brightness evaluation zone is to activate the light; and activate the light when both the ambient light level is within the range of the current brightness evaluation zone and the activation status of the current brightness evaluation zone is not to activate the light. The light may be a backlight.

The system may further comprise a light sensor to provide signals for the ambient light level.

In the system, the component may be a key cap for a key.

In the system, the backlight for the key cap may be controlled separately from a backlight for a display for the device.

In the system, a first brightness evaluation zone may be provided having an upper lux value of between approximately 50 and 300 lux and having an activation status for the backlight as "on". An overlapping brightness evaluation zone to the first brightness evaluation zone may also be provided having a lower lux value of less than the upper lux value of the first brightness evaluation zone and having an activation status for the backlight as "off".

In the system, the module may repeat its evaluation upon detection of a change in the ambient light level past a threshold or an activation of a backlight for a display of the device.

In the system, the electronic device may be a portable electronic device.

In another aspect, an electronic device is provided. The device comprises: a component; a light for the component; a light sensor; a microprocessor; and a module providing instructions for a microprocessor for the device. The module provides instructions to: set a current brightness evaluation zone to a first brightness evaluation zone of a plurality of brightness evaluation zones; set an activation status of a light level to an activation value associated with the current brightness evaluation zone; compare an ambient light level derived from the light sensor for the device to a brightness value associated with the current brightness evaluation zone; change the current brightness evaluation zone to a subsequent brightness evaluation zone in the plurality of brightness evaluation zones, change the activation status of the light level to an activation value associated with the subsequent brightness evaluation zone and re-evaluate whether the ambient light level is or is not within the brightness range of the subsequent brightness evaluation zone when the subsequent brightness evaluation zone exists and the ambient light level is not within the brightness range of the current brightness evaluation zone; change the current brightness evaluation zone to the subsequent brightness evaluation zone, change the activation status of the light level to the activation value associated with the subsequent brightness evaluation zone and re-evaluate whether the ambient light level is or is not within the brightness range of the subsequent brightness evaluation zone when both the ambient light level is within the brightness range of the current light evaluation zone and the activation status of the current brightness evaluation zone is to activate the light; and deactivate the light when both the ambient light level is within the brightness range of the current brightness evaluation zone and the activation status of the current brightness evaluation zone is to not activate the light.

In the device, the component may be a key cap for a key.

In the device, one brightness evaluation zone may have an upper lux value of between approximately 50 and 300 lux and has an activation status for the light as "on"; and an overlapping brightness evaluation zone to the one brightness evaluation zone may have a lower lux value of less than the upper lux value of the first brightness evaluation zone and has an activation status for the light as "off".

In other aspects, various sets and subsets of the above noted aspects are provided.

Generally, an embodiment provides a system, method and device to illuminate a component of an electronic device. Illumination may be provided by a backlight for the component or from an exterior light which shines onto the component. One embodiment provides control activation of a backlight for a key cap of the device. It will be appreciated that another embodiment can provide control of a backlight for other components of the device, such as a display, a sensor, function keys, touchpads, trackballs, etc. An embodiment may provide intensity control of any light for the device. The intensity of the light is provided based on an amount of detected ambient light. Ambient light can be measured in lux (lx) which is a measure of illuminance, which can be expressed as lumens per square meter. Ranges of detected ambient light (e.g. nighttime, dark room, office lighting, daylight, etc.) can be expressed in ranges of lux. One or more levels of backlight may be defined (e.g. dim, mid, bright, etc.). Ranges of backlight levels may be mapped against detected ranges of backlight levels. A range for backlight intensity may overlap, at one or both ends with ranges for detected backlight. A backlight intensity range may abut against a detected backlight range. A backlight intensity range may have a gap between itself and a detected backlight range. A current detected amount of ambient light for the device may be mapped to a corresponding light range and the backlight may be set to the intensity associated with the range. The backlight level may be set or adjusted when the device is activated or reactivated from a "sleep" mode. The backlight level may start at one activation level (for example fully on or fully off) and then adjust up or down to the backlight level for range associated with the detected light. Further adjustments may be made to the backlight level when a change in detected ambient light and/or a change in an operating state of the device is detected. Thresholds may be applied for the changes.

Now, further detail is provided on components of a device according to an embodiment. Thereafter, further detail is provided on exemplary algorithms, processes and methods relating to an embodiment.

Referring to FIG. 1, an electronic device for receiving electronic communications in accordance with an embodiment of the disclosure is indicated generally at 10. In the present embodiment, electronic device 10 is based on a computing platform having functionality of an enhanced personal digital assistant with cellphone and e-mail features. It is, however, to be understood that electronic device 10 can be based on construction design and functionality of other electronic devices, such as portable electronic devices, handheld electronic devices, wireless devices, smart telephones, desktop computers pagers or laptops having telephony equipment. In a present embodiment, electronic device 10 includes a housing 12, a display 14 (which may be a liquid crystal display or LCD), speaker 16, a light emitting diode (LED) indicator 19, an input device 20 (which may be a touchpad), an ESC ("escape") key 22, keypad 24, control keys 24A, a trackwheel (not shown), a trackball (not shown), a telephone headset comprised of an ear bud 28 and a microphone 30. Input device 20 and ESC key 22 can be inwardly depressed as a means to provide additional input signals to device 10.

It will be understood that housing 12 can be made from any suitable material as will occur to those of skill in the art and may be suitably formed to house and hold all components of device 10.

Device 10 is operable to conduct wireless telephone calls, using any known wireless phone system such as a Global System for Mobile Communications (GSM) system, Code Division Multiple Access (CDMA) system, CDMA 2000 system, Cellular Digital Packet Data (CDPD) system and Time Division Multiple Access (TDMA) system. Other wireless phone systems can include Wireless WAN (IMS), Wireless MAN (Wi-max or IEEE 802.16), Wireless LAN (IEEE 802.11), Wireless PAN (IEEE 802.15 and Bluetooth), etc. and any others that support voice. Additionally, a Bluetooth network may be supported. Other embodiments include Voice over IP (VoIP) type streaming data communications that can simulate circuit-switched phone calls.

Various applications are provided on device 10, including email, telephone, calendar and address book applications. A graphical user interface (GUI) providing an interface to allow entries of commands to activate these applications is provided on display 14 through a series of icons 26. Shown are calendar icon 26A, telephone icon 26B, email icon 26C and address book icon 26D. Such applications can be selected and activated using the keypad 24 and/or the input device 20.

Figure 2:
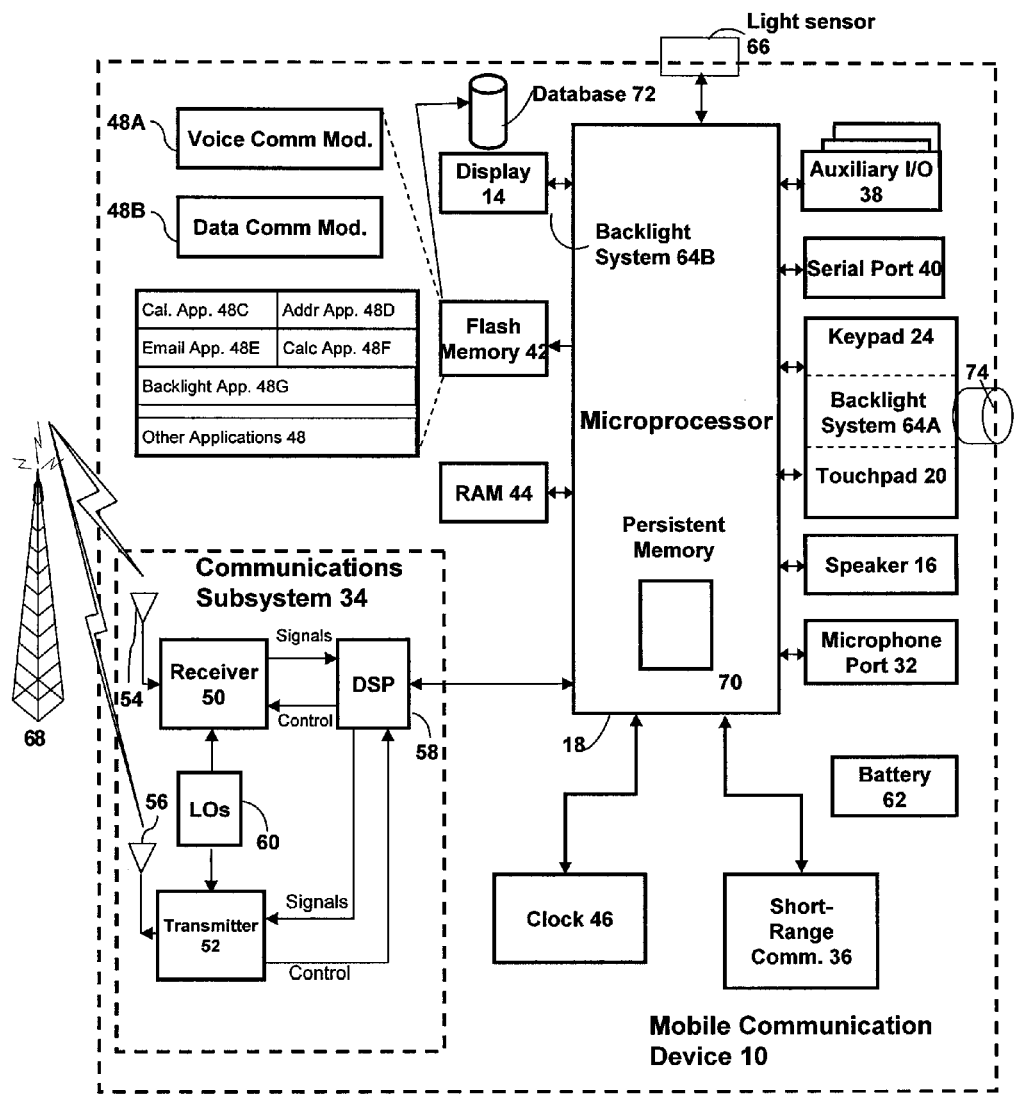
FIG. 2 is a block diagram of internal components of the device of FIG. 1 including the key and the backlight adjustment system.

Referring to FIG. 2, functional elements of device 10 are provided. The functional elements are generally electronic or electro-mechanical devices. In particular, microprocessor 18 is provided to control and receive data, transmissions, inputs and outputs related to device 10. Microprocessor 18 is shown schematically as coupled to keypad 24, display 14 and other internal devices. Microprocessor 18 controls the operation of the display 14, as well as the overall operation of the device 10, in response to actuation of keys on the keypad 24 by a user. Microprocessor 18 preferably controls the overall operation of the device 10 and its components. Exemplary microprocessors for microprocessor 18 include microprocessors in the Data 950 (trade-mark) series, the 6200 series and the PXA900 series, all available at one time from Intel Corporation. The term "microprocessor" includes an integrated circuit that processes instructions provided to it in software, firmware, microcode, etc.

In addition to the microprocessor 18, other internal devices of the device 10 include: a communication subsystem 34; a short-range communication subsystem 36; keypad 24; and display 14; with other input/output devices including a set of auxiliary I/O devices through port 38, a serial port 40, a speaker 16 and a microphone port 32 for microphone 30; as well as memory devices including a flash memory 42 (which provides persistent storage of data) and random access memory (RAM) 44; clock 46 and other device subsystems (not shown). The device 10 is preferably a two-way radio frequency (RF) communication device having voice and data communication capabilities. In addition, device 10 preferably has the capability to communicate with other computer systems via the Internet.

Operating system software executed by microprocessor 18 is preferably stored in a computer readable medium, such as flash memory 42, but may be stored in other types of memory devices (not shown), such as read only memory (ROM) or similar storage element. In addition, system software, specific device applications, or parts thereof, may be temporarily loaded into a volatile storage medium, such as RAM 44. Communication signals received by the mobile device may also be stored to RAM 44. Database 72 may be provided in flash memory 42 to store images, variables and run time data relating to applications 48.

Microprocessor 18, in addition to its operating system functions, enables execution of software applications on device 10. A set of software applications 48 that control basic device operations, such as a voice communication module 48A and a data communication module 48B, may be installed on the device 10 during manufacture or downloaded thereafter.

Communication functions, including data and voice communications, are performed through the communication subsystem 34 and the short-range communication subsystem 36. Collectively, subsystem 34 and subsystem 36 provide the signal-level interface for all communication technologies processed by device 10. Various other applications 48 provide the operational controls to further process and log the communications. Communication subsystem 34 includes receiver 50, transmitter 52 and one or more antennas, illustrated as receive antenna 54 and transmit antenna 56. In addition, communication subsystem 34 also includes processing module, such as digital signal processor (DSP) 58 and local oscillators (LOs) 60. The specific design and implementation of communication subsystem 34 is dependent upon the communication network in which device 10 is intended to operate. For example, communication sub-system 34 of device 10 may operate with the Mobitex (trade-mark), DataTAC (trade-mark) or General Packet Radio Service (GPRS) mobile data communication networks and also operate with any of a variety of voice communication networks, such as Advanced Mobile Phone Service (AMPS), Time Division Multiple Access (TDMA), Code Division Multiple Access (CDMA), CDMA 2000, Personal Communication Service (PCS), Global System for Mobile Communication (GSM), etc. Other types of data and voice (telephonic) networks, both separate and integrated, may also be utilized with device 102. In any event, communication sub-system 504 provides device 102 with the capability of communicating with other devices using various communication technologies, including instant messaging (IM) systems, text messaging (TM) systems and short message service (SMS) systems.

In addition to processing communication signals, DSP 58 provides control of receiver 50 and transmitter 52. For example, gains applied to communication signals in receiver 50 and transmitter 52 may be adaptively controlled through automatic gain control algorithms implemented in DSP 58.

In a data communication mode a received signal, such as a text message or web page download, is processed by the communication subsystem 34 and is provided as an input to microprocessor 18. The received signal is then further processed by microprocessor 18 which can then generate an output to the display 14 or to an auxiliary I/O port 38. A user may also compose data items, such as e-mail messages, using keypad 24, input device 20, or a thumbwheel (not shown), and/or some other auxiliary I/O device connected to port 38, such as a touchpad, a rocker key, a separate thumbwheel or some other input device. The composed data items may then be transmitted over communication network 68 via communication subsystem 34.

In a voice communication mode, overall operation of device 10 is substantially similar to the data communication mode, except that received signals are output to speaker 16, and signals for transmission are generated by microphone 30. Alternative voice or audio I/O subsystems, such as a voice message recording subsystem, may also be implemented on device 10.

Short-range communication subsystem 36 enables communication between device 10 and other proximate systems or devices, which need not necessarily be similar devices. For example, the short-range communication subsystem may include an infrared device and associated circuits and components, or a Bluetooth (trade-mark) communication module to provide for communication with similarly-enabled systems and devices.

Powering the entire electronics of the mobile handheld communication device is power source 62 (shown in FIG. 2 as a battery). Preferably, the power source 62 includes one or more batteries. More preferably, the power source 62 is a single battery pack, especially a rechargeable battery pack. A power switch (not shown) provides an "on/off" switch for device 10. Upon activation of the power switch an application 48 is initiated to turn on device 10. Upon deactivation of the power switch, an application 48 is initiated to turn off device 10. Power to device 10 may also be controlled by other devices and by internal software applications.

One or more of keys 24 may also be backlit by backlight system 64A, especially under low-light conditions. Display 14 has backlight system 64B to assist in the viewing display 14. Other components, such as touchpad 20, control keys 24A may be lit by either of systems 64A or 64B or by other systems. Control of backlighting for these other components may be conducted independently of control for keys 24 or other components. The light from either 64A or 64B may also be provided to one or more light ports 74 on case 12 of device 10, providing aesthetic/ambient/artistic light for device 10.

Backlight system 64A and 64B may be separate systems or may be the same system. One or both of backlight systems 64A and 64B comprises a lighting source, such as a series of LEDs or a lamp and a controller to control activation of the lighting source. The lamp may be fluorescent, incandescent, electroluminescent or any other suitable light source. The light source may be located behind display 14 and/or keys 24. For backlight system 64A, as the lighting sources are illuminated, their light shines through the interior of key 24 through a translucent portion of the top of key 24. For system 64B, as the lighting sources are illuminated, their light shines through the LCD panel providing backlight to the display 14. An alternative lighting system to backlight system 64A may provide an exterior light that shines onto keys 24.

The intensity of the backlight level for either system 64A or 64B may be controlled by the controller by selectively activating a selected number of lighting sources (e.g. one, several or all LEDs) or by selectively controlling the activation duty cycle of the activated lighting sources (e.g. a duty cycle anywhere between 0% to 100% may be used). The activation cycle may be controlled through a series of time analog signals or a digital pulse train, such as a pulse-width modulation (PWM) signal. As will be described in more detail below, backlight systems 64A and 64B can be made responsive to signals from a software module that determines a new brightness level for an image.

Light sensor 66 is provided on device 10. Sensor 66 is a light sensitive device which converts detected light levels into an electrical signal, such as a voltage or a current. It may be located anywhere on device 10, having considerations for aesthetics and operation characteristics of sensor 66. In one embodiment, an opening for light to be received by sensor 66 is located on the front cover of the housing of device 10 to reduce the possibility of blockage of the opening. In other embodiments, multiple sensors 66 may be provided and the software may provide different emphasis on signals provided from different sensors 66. The signal(s) provided by sensor(s) 66 can be used by a circuit in device 10 to determine when device 10 is in a well-lit, dimly lit or moderately-lit environment. This information can then be used to control backlight levels for display 14 and/or key(s) 24. In another embodiment, LED indicator 19 may be also used as a light sensor. The output of light sensor 66 may be used by backlight systems 64A and 64B to adjust their backlight levels. An embodiment may calibrate light sensor 66 in order to convert analog-to-digital converter (ADC) values to illuminance (lux).

Brief descriptions are provided on the applications 48 stored and executed in device 10. The applications may also be referred to as modules and may include any of software, firmware and hardware to implement a series of commands and instructions to carry out their functions. Voice communication module 48A and data communication module 48B have been mentioned previously. In some embodiments, one or more communication processing functions may be shared between modules 48A and 48B.

Additional applications include the following applications. Calendar 48C application tracks appointments and other status matters relating to a user and device 10. It is activated by activation of calendar icon 26A on display 14. Address book 48D enables device 10 to store contact information for persons and organizations. Address book 48D is activated by activation of address book icon 26D on display 14. Names, addresses, telephone numbers, e-mail addresses, cellphone numbers and other contact information is stored. Email application 48E provides modules to allow a user of device 10 to generate email messages on device 10 and send them to their addressees. Application 48E also provides a GUI which provides a historical list of emails received, drafted, saved and sent. Text for emails can be entered through keypad 24. Email application 48E is activated by activation of email icon 26C on display 14. Calculator application 48F provides modules to allow a user of device 10 to create and process arithmetic calculations and display the results through a GUI.

Backlight adjustment application (BAA) 48G provides the control signals to adjust the backlight level for one or both of key(s) 24, keys 24A and/or display 14 by controlling operating parameters of one or both backlight systems 64A and 64B. BAA 48G may be provided as an embedded application within an operating system for device 10. Alternatively, BAA 48G may be a separate, user accessible application. BAA 48G allows a user or another application to select which components on device 10 are backlit and how they are backlit. Other applications operating on device 10 may generate requests to BAA 48G to activate/deactivate/change a backlight level for a component. BAA 48G can generate an appropriate signal, such as a pulse width modulation (PWM) signal or values for a PWM signal, that can be used to drive a backlight in backlight systems 64A and 64B to an appropriate level as determined from the above noted calculations. If backlight system 64 utilizes a duty cycle signal to determine a backlight level, BAA 48G can be modified to provide a value for such a signal, based on inputs received. A GUI may be provided to allow the user of device 10 to use BAA 48G to input/change operating parameters of systems 64A or 64B. Further detail on calculations conducted by application 48G are provided below.

Further detail is now provided on notable aspects of a backlight system of an embodiment that determines when and how to activate a backlight on a component, such as key 24 using backlight system 64A.

Figure 3:
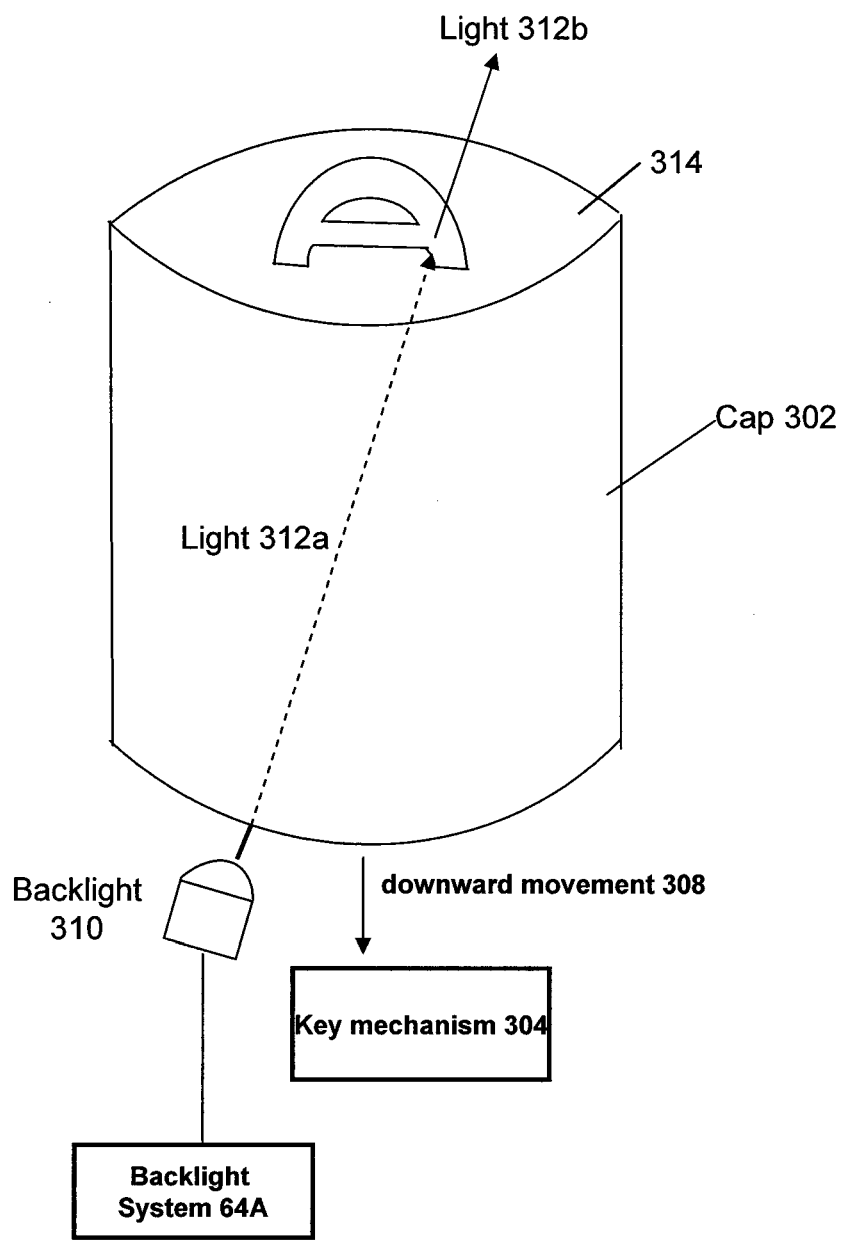
FIG. 3 is a top perspective exploded, cut-out view of the key and the backlight adjustment system of FIG. 1.

Referring to FIG. 3, in an embodiment, key 24 in keypad 24 (FIG. 1) is shown through key assembly 300. Key assembly 300 includes the following elements: key cap 302 and switch mechanism 304. Cap 302 is an exterior shell that a user finds and depresses to activate key 24. A plunger (not shown) may be provided as part of cap 302 and may be an internal component within the body of cap 302. The plunger transmits the downward force imparted when key 24 is depressed to switch mechanism 304. Alternatively, cap 302 may be connected directly to switch mechanism 304. Switch mechanism 304 receives a downward movement (shown as arrow 308) from an imparted force on cap 302 by any means, such as contact with cap 302 or through a key plunger (not shown) connecting cap 302 to mechanism 304. When sufficient pressure imparted on cap 302 is transmitted to mechanism 304, mechanism 304 generates a signal indicating that key 24 has been depressed for device 10. Backlight system 64A is provided with its backlight 310.

Key cap 302 is generally the shape of a hollow upright cylinder having an open end on its bottom and a raised convex-shaped dome on its top. It can be of any size suitable for a keyboard of an electronic device. It can be about the size and shape of a typical key on a regular, full-size keyboard; or it can be larger than such a key; or it can be the size and shape of a key that is provided on a personal digital assistant. The cap may be made of plastic, polycarbonate, metal or other materials. The interior cavity of the key may be of any suitable shape as well. Other keys may be solid in one or more places, but with a transparent and/or translucent parts within those places that collectively allow light from light 310 to transmit through the interior of key 24 (shown as light 312A) through its top to alight the exterior environment of device 10 as exterior light 312B. As such, dimensions and composition of parts of cap 302 may be suitably provided to allow this interior/exterior light transmission. It will be appreciated that in other embodiments, dimensions and shapes of the elements of another key assembly may be modified to meet any design, functional, aesthetic or structural requirements.

Key 24 is embossed with a symbol on its top to identify its function. As shown in FIG. 3, the value assigned to the key is the character "A". One or more paint layer(s) 314 are applied to the top of cap 302 and different regions in each layer 314 provide specific transparent or translucent regions and other regions of opaque regions. The paint layers may be a coloured paint, lacquer or other suitable coating. The top of key 24 may also have specific transparent or translucent regions and other regions of opaque regions. The symbol may be presented in outline, shadow, block or other formats. Lower layer 314 may be a "black" transparent paint; upper layer may be a non-transmissive silver paint.

As provided, the net effect of the transparent and opaque regions in key 24 and layers 312 illuminates aspects of the "A" symbol, when backlighted. Depending on the visual design for the backlighting, one or more of the following parts of the character may be illuminated: its interior; its exterior; its outline; and a shadow region. For example, for the letter "A" as shown in FIG. 3, one embodiment has the interior sections of the character provided in transparent or translucent paint. As such if key 302 was an "A" key then the light 312b would shine through either the body of the "A" when backlight 310 is activated and not through the background of the "A" (or at least not as much). Where paint layer 314 is non-transmissive, areas where light is to intended to be transmitted through may have paint etched out using techniques known in the art, including lasers. In some embodiments, the upper paint layer 314 may be the only paint layer applied to the top of key 302.

It will be appreciated that the terms transparent, translucent and opaque have some degree of variations allowed to those of skill in the relevant art of materials composition. As such, for example, a material which is transparent may have some colourations therein; and an opaque material may allow some light to transmit therethrough.

For the sake of illustration, FIG. 3 shows only one backlight 310 for key 24. However, it will be appreciated that two or more backlights 310 may be provided for key 24 where backlights 310 are located around key 24 and are used to illuminate adjacent keys 24 or adjacent components, such as control keys 24A and input device 20.

In providing a backlight for key 24, backlight system 64A may provide a variable amount of backlight from light 310 depending on a detected ambient light for device 10 from sensor 66. An embodiment may also change an intensity of backlight based on other ambient conditions (e.g. proximity of device 10 to a user's face, current time, current ambient environment—inside/outside, etc.). The backlight may also be set based on one or more predetermined conditions, such as the state of operation of device 10 (e.g. "on", "off", "sleep mode", etc.), the current time associated with device 10, the current location associated with device 10 and/or the current ambient conditions of device 10. Further detail on control of backlight 310 is provided in the context of ambient light conditions. However, it will be appreciated that the disclosed features may be applied to changing intensity based on other conditions.

As previously noted, one measure of quantitative light is lux. An embodiment defines one or more ranges of ambient light conditions and defines one or more ranges for backlight levels.

Figure 4:
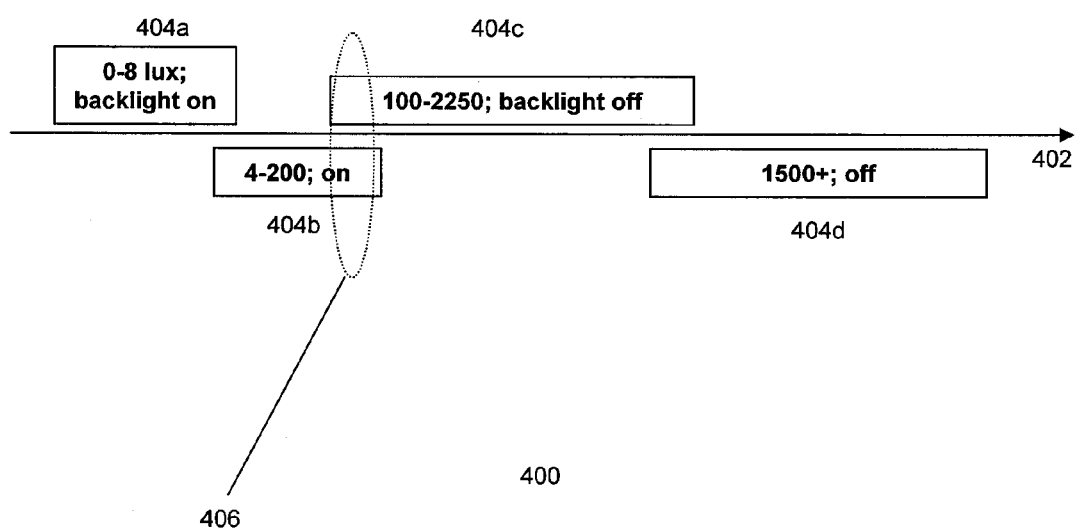
FIG. 4 is a diagram showing a non-linear scale of lux values starting from 0 at the left end and increasing as the scale progresses rightward with brightness zones used by the backlight adjustment system of FIG. 1.

Referring to FIG. 4, diagram 400 shows non-linear scale 402 of lux values starting from 0 at the left end and increasing as the scale progresses rightward. Boxes 404 show zones (ranges) of ambient light levels that an embodiment uses to characterise brightness evaluation zones used by an embodiment to set conditions when the backlight is to be activated for detected levels of ambient light. Box 404a spans from 0-8 lux and represents a "dark" zone, where a backlight is preferred to be on. Box 404b spans from 4-200 lux and is equated to a "dim backlight" zone where the backlight is preferred to be on. Box 404c spans from 100-2250 lux and represents an "office interior" zone. A keypad backlight is preferred to be off for this zone. Box 404d spans from above 1500 lux or more and represents a "bright exterior (sunlight)" zone. A keypad backlight is preferred to be off for this zone. More or less zones can be defined. For example, zones 404a and 404b may be combined and zones 404c and 404d may be combined, thereby providing two zones. The zones may overlap at one or more of their ends. A subzone may be provided within a given zone. The term "zone" is not meant to be limiting and can present any range, limit, boundary, etc. for a detected ambient light level and/or a predetermined brightness level for backlighting.

Table A shows exemplary set of ambient light conditions, expressed as brightness evaluation zones, for boxes 404:

TABLE A

| Brightness evaluation zones | | |
| --- | --- | --- |
| Zone | Lux | Backlight |
| Dark | 0-8 | On |
| Dim | 4-200 | On |
| Office | 100-2250 | Off |
| Bright | 1500+ | Off |

It can be seen that one or more end regions of brightness evaluation zones in Table A overlap, for example, the dark zone at its 4-8 lux level overlaps with the 4-8 lux level of the dim zone. In another embodiment, the dark zone may be eliminated and/or combined with the dim zone. An embodiment provides an area of effectiveness in the overlapping zones of the office and dim zones. In other embodiments, a first zone, such as the dim zone, can be set to have an upper limit that is between approximately 50 and 300 lux and the next brighter zone, such as office zone in Table A, can be set to have its lower limit to be below the upper limit the first zone. Further detail on this feature is provided in FIG. 4.

Whether a backlight is activated or not is determined by the right most column. The backlight level in one embodiment is binary—either on or off. However, in other embodiments, different intensities of backlights can be provided, for example by varying the number of activated lights or by varying the duty cycles for the lights. Other zones may be added and/or deleted. For example a "mid backlight level" may be added that spans between the low and bright level, having a level of between 500-1000 lux.

Figure 5:
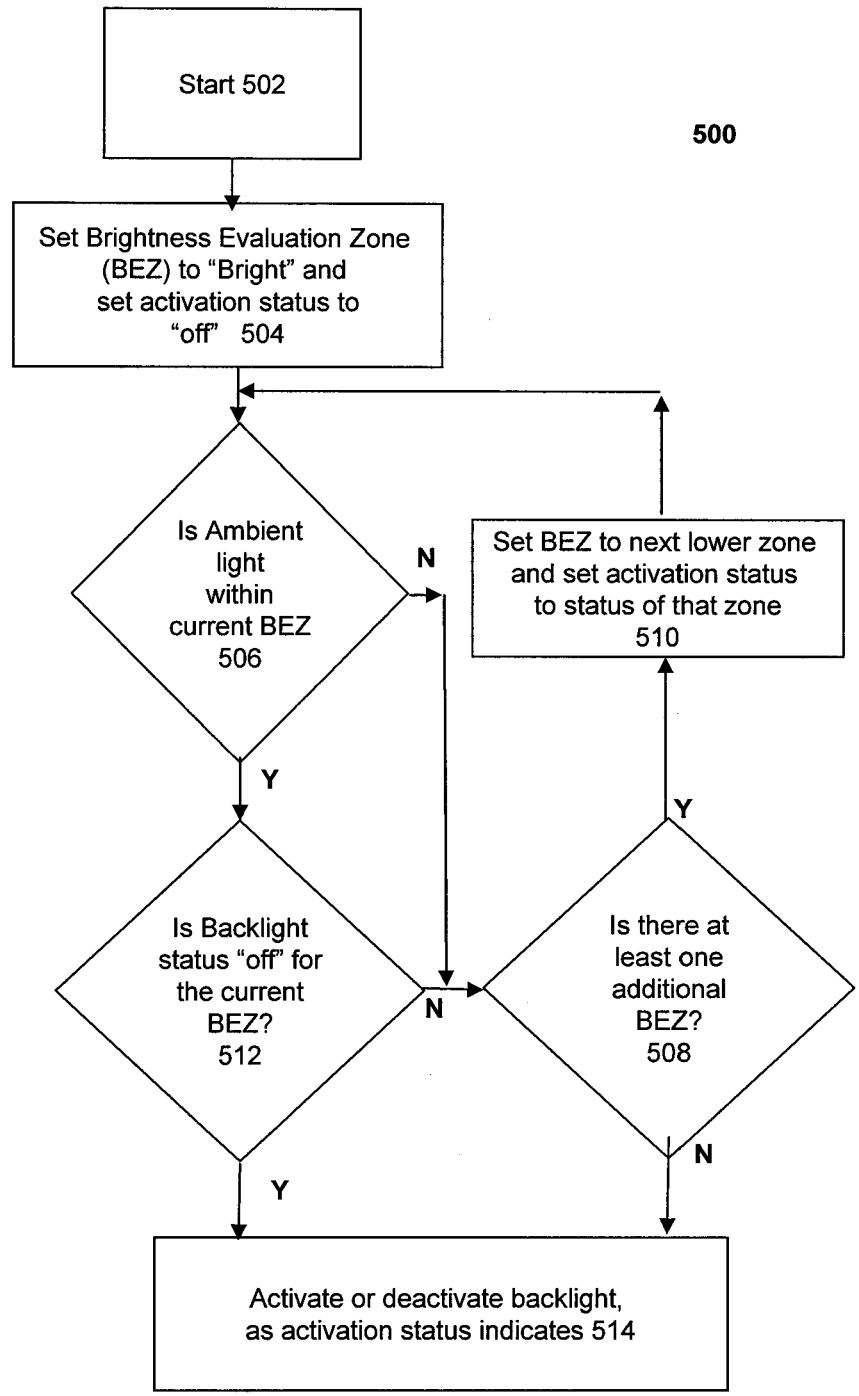
FIG. 5 is a flow chart of an algorithm executed by the backlight adjustment system of FIG. 1.

Referring to FIG. 5, flow chart 500 presents an exemplary algorithm that is executed by an embodiment to determine a backlight level for a component of device 10. The process may be executed in whole or in part by BAA 48G or by one or more additional modules. For illustration purposes, this example uses is used for illuminating a key cap 302 with black paint on its top. Other painted caps, e.g. white, red, yellow, blue or purple painted caps, may have similar or different lux values for one or more of the zones. Such other colour keys may have the same or different zones.

As noted, an embodiment provides a system, method and device to activate a backlight for a component in a device. The embodiment uses brightness evaluation zones, such as those in Table A, which presents a scale of zones. The embodiment selects a zone at or towards one end of the scale and progresses through one or more of the zones towards the other end of the scale. As each zone is selected, the embodiment evaluates each zone to determine whether and when to activate the backlight for given conditions of ambient light. In doing so, the embodiment sets a current brightness evaluation zone (BEZ) for the device and sets an activation status of the backlight level to be an activation value associated with the current brightness evaluation zone. The embodiment compares an ambient light level for the device to the current brightness evaluation zone. Evaluation loops are provided to test and change the current brightness evaluation zone against the detected ambient light. In one part of the loop, if the ambient light level is not within the range of the current brightness evaluation zone then a check is made to determine whether there is at least another zone in the scale in the direction of progression. If there is, then the current brightness evaluation zone is changed to the next zone in the scale and the activation status is set to an activation level for that zone. Next, the ambient light level is re-evaluated to determine if it is or is not within the range of the new current brightness evaluation zone. If there is not, then this is an exit condition and the backlight is either activated or deactivated according to the activation status of the current backlight evaluation zone.

If the ambient light level is the range of the current brightness evaluation zone, then a second test is performed. In the second test, the activation status of the current backlight evaluation zone is considered. If the status indicates that the backlight is not to be activated (i.e. backlight is "off"), then the backlight process ends and the backlight is deactivated (following that activation status). This last process forms the final part of the exit condition noted above. For a simple algorithm, the backlight is either on or off. As such, if a backlight is not on, it is off and if the backlight is not off, it is on.

If the activation status of the current brightness evaluation zone is to activate the backlight (i.e. backlight is "on"), then a check is made to determine whether there is at least another zone in the scale in the direction of progression. If there is, then the current brightness evaluation zone is changed to the next zone in the scale, the activation status is set to the activation level of that zone and the ambient light level is re-evaluated to determine if it is or is not within the range of the new current brightness evaluation zone.

Other embodiments may implement multiple backlight levels, where similar principles would be the same, namely to determine the brightness evaluation zone corresponding to current ambient lighting and with preferably minimum backlight level.

FIG. 5 illustrates a process progressing through an exemplary scale of brightness evaluation zones from the brightest zone through dimmer zones. In particular, at block 502, a process associated with flow chart 500 begins. Briefly, an embodiment makes a determination as to a proper change, if any, to the output level of backlight system 64A and then implements the change, if any. The first substantive action is at block 504, an embodiment sets the current brightness evaluation zone to "bright", which is the brightest brightness evaluation zone of Table A. The activation status is set to "off", which is the activation level for the "bright" zone. Again, the backlight is not necessarily activated at this time at that brightness level. However, in other embodiments, adjustments may be made to an activated backlight system.

From block 504, block 506 tests whether the detected ambient light around device 10 is within the current brightness evaluation zone (initially the "bright" zone). This may be done by comparing the detected ambient light level (in lux) against the lux range of the current brightness evaluation zone. If the detected ambient light level is not within the current brightness evaluation zone, then the embodiment proceeds to block 508. At block 508 another test is performed to determine whether there is at least one additional brightness evaluation zone in the scale beneath the current zone (as the scale is being traversed from the brightest to the dimmest zones, in this example).

If there is another zone, then at block 510, the embodiment sets the current brightness evaluation zone to the next lower brightness evaluation zone level (here "office", per Table A), the activation status is set to the activation level for that zone and the pending output of the backlight is set to correspond to the new current brightness evaluation zone. For "office" the pending output of the backlight remains "off". At the completion of block 510, the embodiment returns to block 506 for a subsequent test. This cycle among blocks 506, 508 and 510 will continue until at block 508, there is no further, lower brightness evaluation zone(s) in the scale. For this algorithm, this loop will exit to block 512 at least once when the ambient light is in the brightness evaluation zone's range. Other exit conditions can be established (e.g. a threshold of a number of evaluations, a time timeout condition, etc.). From block 508, if the exit condition is satisfied, the process moves to block 514 (described later).

Going back to block 506, if the detected ambient light level is within the range of the current brightness evaluation zone, then the embodiment proceeds to block 512. In block 512, a determination is made as to whether the backlight status is "off" for the current backlight evaluation zone. If the backlight status is "on" for the current brightness evaluation zone, then the embodiment proceeds to block 508. This is a second arm of a cycle among blocks 506, 508 and 510. For block 512, if backlight status is "off", then the embodiment proceeds to block 514. At block 514, the output level for system 64A is set according to the activation status of the current brightness evaluation zone. If the output level is set to be "on", then system 64A activates the backlight. If the output level is set to be "off", then system 64A does not activate the backlight. Block 514 represents an exit path for the evaluation loop defined by blocks 506, 508, 510 and 512.

One notable ambient light region where the embodiment is effective is in setting backlight(s) where there is an overlap between the "dim" and the "office" settings (Table A) per region 406 (FIG. 4). In other embodiments, other effective regions can be defined, depending on the particular operating backlight conditions established. A reason that this region is effective for evaluating a backlight is because the difference in backlight levels (on/off) between the overlapping zones allows an embodiment to select the zone with minimum backlight level.

In evaluating such overlapping areas, other embodiments may have alternative definitions for zones and their ranges, compared with those in Table A. For example, one embodiment may define a first brightness evaluation zone having an upper lux value of between approximately 50 and 300 lux and having an activation status for the backlight as "on". Its overlapping brightness evaluation zone at its upper range may have a lower lux value of less than the upper lux value of the first brightness evaluation zone. The overlapping brightness evaluation zone may have an activation status for the backlight as "off". The upper lux value ranges may be changed to any appropriate range; see for example the upper ranges of any of the ranges in Table A or other values. As another example, another embodiment may define a first brightness evaluation zone having an lower lux value of between approximately 30 and 150 lux and having an activation status for the backlight as "off". Its overlapping brightness evaluation zone at its lower range may have an upper lux value of more than the lower lux value of the first brightness evaluation zone. That overlapping brightness evaluation zone may have an activation status for the backlight as "on". The lower lux value ranges may be changed to any appropriate range; again, see for example the upper ranges of any of the ranges in Table A or other values.

Note that one practical factor in the operation of a backlight of an embodiment is the amount of hysteresis in the backlight activation cycles. Hysteresis is related to the amount of overlap; the presence of hysteresis may reduce the number of backlight adjustments made for system 64A.

An alternative embodiment may set the initial backlight zone to be the dimmest of the brightness evaluation zones (per Table A), where subsequent adjustments are made to go to the next higher brightness evaluation zone(s), as necessary. This alternative may be provided to control the backlight for display 14.

An embodiment executing flow chart 500 in BAA 48G may be activated at predetermined conditions to implement flow chart 500, such as when device 10 is initially activated or becomes re-activated, e.g. after a sleep mode re-activation.

Once the backlight level is set, if a subsequent change in the ambient light level is detected (e.g. a change to at least one or two zones from the current brightness evaluation zone), then a re-execution of flow chart 500 may be conducted.

An alternative embodiment may execute flow chart 500 upon certain conditions, e.g. for certain initial detected ambient light levels that are above, below, or outside a given detected range or when a change in detected ambient light is made. The change in light may be subject to a predetermined threshold, such as a change that it outside the current backlight evaluation zone. In such an embodiment, the backlight level, as a default may be set to be a certain value and if the detected ambient light zone is outside that zone, by a predetermined amount, then flow chart 500 is executed. Other conditions may be when an application on device 10 enables or disables a keypad backlight timeout setting.

The algorithm of flow chart 500 provides that the backlight is either fully on or fully off for given ambient light conditions. Other embodiments may change the intensity of the level of activation of the backlight system 64A, once a determination has been made to activate same. In systems where the backlight intensity is varied, the backlight evaluation algorithm become more complex than chart 500, as the algorithm will choose a zone corresponding with the minimum intensity level. The embodiment may conduct additional tests to evaluate what intensity of backlight to use, once it has located a current backlight evaluation zone that has an "off" status (per block 510, FIG. 5). An embodiment may exit the process of flow chart 500 once a current BEZ with an activation status for a backlight as "off" is evaluated with no additional tests necessary. The "off" status ensures that minimum power for the backlight is going to be used. An embodiment provides additional checks when the ambient light is in an overlap region of, for example, a bright backlight and a dim backlight. In such a situation, an algorithm loops through processes 506, 508, 510 and 512, while tracking which applicable backlight evaluation zone (according to block 506) has the dimmest backlight.

It will be appreciated that BAA 48G and other applications in the embodiments can be implemented using known programming techniques, languages and algorithms. The titles of the applications are provided as a convenience to provide labels and assign functions to certain application. As noted earlier, an application may also be referred to as a module. It is not required that each application perform only its functions as described above. As such, specific functionalities for each application may be moved between applications or separated into different applications. Applications may be contained within other applications. Different signalling techniques may be used to communicate information between applications using known programming techniques. Known data storage, access and update algorithms allow data to be shared between applications. It will further be appreciated that other applications and systems on device 10 may be executing concurrently with any application 48. As such, backlight adjustment application 48G may be structured to operate in as "background" applications on device 10, using programming techniques known in the art.

As used herein, the wording "and/or" is intended to represent an inclusive-or. That is, "X and/or Y" is intended to mean X or Y or both.

In this disclosure, where a threshold or measured value is provided as an approximate value (for example, when the threshold is qualified with the word "about"), a range of values will be understood to be valid for that value. For example, for a threshold stated as an approximate value, a range of about 25% larger and 25% smaller than the stated value may be used. Thresholds, values, measurements and dimensions of features are illustrative of embodiments and are not limiting unless noted. Further, as an example, a "sufficient" match with a given threshold may be a value that is within the provided threshold, having regard to the approximate value applicable to the threshold and the understood range of values (over and under) that may be applied for that threshold.

It will be appreciated that the embodiments relating to devices, servers and systems may be implemented in a combination of electronic hardware, firmware and software. The firmware and software may be implemented as a series of processes, applications and/or modules that provide the functionalities described herein. The algorithms and processes described herein may be executed in different order(s). Interrupt routines may be used. Data may be stored in volatile and non-volatile devices described herein and may be updated by the hardware, firmware and/or software.

The present disclosure is defined by the claims appended hereto, with the foregoing description being merely illustrative of embodiments of the present disclosure. Those of ordinary skill may envisage certain modifications to the foregoing embodiments which, although not explicitly discussed herein, do not depart from the scope of the present disclosure, as defined by the appended claims.

The invention claimed is:

1. A method of controlling a light for a component of an electronic device, comprising:
   defining a plurality of brightness evaluation zones within a scale of brightness levels for the device;
   defining an activation status for the light for each brightness evaluation zone of the plurality of brightness evaluation zones; and
   evaluating detected ambient light around the device against a progression of zones in the plurality of brightness evaluation zones until the detected ambient light is in within one zone of the progression of zones, then if the activation status for the one zone indicates that the light is not to be activated, then deactivating the light;

if the activation status for the light for the one zone indicates that the light is to be activated, then determining whether a further zone of the plurality of zones exists in the progression, and if the further zone exists then the activation status is set to the activation status of the further zone and the detected ambient light is re-evaluated to determine if it is or is not within the range of further zone, otherwise activating the light.

2. The method of controlling a light for a component of an electronic device as claimed in claim 1, wherein:

the progression moves from a first brightness evaluation zone through less bright zones in the plurality of brightness evaluation zones.

3. The method of controlling a light for a component of an electronic device as claimed in claim 1, wherein the plurality of brightness evaluation zones comprises at least two zones.

4. The method of controlling a light for a component of an electronic device as claimed in claim 1, wherein:

the light is a backlight for the component; and
the component is a key cap for a key.

5. The method of controlling a light for a component of an electronic device as claimed in claim 4, wherein:

the light for the key cap is controlled separately from a second light for a display for the device.

6. The method of controlling a light for a component of an electronic device as claimed in claim 1, wherein:

one brightness evaluation zone of the plurality of brightness evaluation zones has an upper lux value of between approximately 50 and 300 lux and has an activation status for the light as "on"; and an overlapping brightness evaluation zone to the one brightness evaluation zone in the plurality of brightness evaluation zones has a lower lux value of less than the upper lux value of the one brightness evaluation zone and has an activation status for the light as "off".

7. The method of controlling a light for a component of an electronic device as claimed in claim 1, wherein:

one brightness evaluation zone of the plurality of brightness evaluation zones has an lower lux value of between approximately 30 and 150 lux and has an activation status for the light as "off"; and an overlapping brightness evaluation zone to the one brightness evaluation zone in the plurality of brightness evaluation zones has an upper lux value of more than the lower lux value of the one brightness evaluation zone and has an activation status for the light as "on".

8. The method of controlling a light for a component of an electronic device as claimed in claim 1, wherein the progression moves from a first brightness evaluation zone through brighter zones in the plurality of brightness evaluation zones.

9. The method of controlling a light for a component of an electronic device as claimed in claim 1, wherein the method is repeated upon detection of a change in the detected ambient light past a threshold or an activation of a light for a display of the device.

10. A method of controlling a light for a component of an electronic device, comprising:

for the device setting a current brightness evaluation zone to a first brightness evaluation zone of a plurality of brightness evaluation zones;

setting an activation status of a light level for the light to an activation value associated with the current brightness evaluation zone;

comparing an ambient light level for the device to the brightness range associated with the current brightness evaluation zone;

if the ambient light level is not within the brightness range, then if a subsequent brightness evaluation zone to the current brightness evaluation zone in the plurality of brightness evaluation zones exists, then changing the current brightness evaluation zone to the subsequent brightness evaluation zone, changing the activation status to a second activation value associated with the subsequent brightness evaluation zone and re-evaluating whether the ambient light level is or is not within the brightness range of the subsequent brightness evaluation zone;

if the subsequent brightness evaluation zone does not exist, then activating the light according to the activation status the current brightness evaluation zone, and if the ambient light level is within the brightness range, then if the activation status of the current brightness evaluation zone is to activate the light, then if the subsequent brightness evaluation zone exists, then changing the current brightness evaluation zone to the subsequent brightness evaluation zone, changing the activation status to the second activation value associated with the subsequent brightness evaluation zone and re-evaluating whether the ambient light level is or is not within the brightness range of the subsequent brightness evaluation zone; and if the subsequent brightness evaluation zone does not exist, then activating the light according to the activation status of the current brightness evaluation level;

if the activation status of the current brightness evaluation zone is not to activate the light, then deactivating the light.

11. The method of controlling a light for a component of an electronic device as claimed in claim 10, wherein:

the first brightness evaluation zone is the brightest zone in the plurality of brightness evaluation zones; and the subsequent brightness evaluation zone is a next brightest zone to the first brightness evaluation zone.

12. The method of controlling a light for a component of an electronic device as claimed in claim 10, wherein:

at least two zones are provided for the plurality of brightness evaluation zones.

13. A system for controlling a light for a component of an electronic device, comprising:

a module providing instructions for a microprocessor for the device to define a plurality of brightness evaluation zones within a scale of brightness levels for the device;

define an activation status for the light for each brightness evaluation zone of the plurality of brightness evaluation zones; and evaluate detected ambient light around the device against a progression of zones in the plurality of brightness evaluation zones until the detected ambient light is in within one zone of the progression of zones, then if the activation status for the one zone indicates that the light is not to be activated, then deactivate the light;

if the activation status for the light for the one zone indicates that the light is to be activated, then determine whether a further zone of the plurality of zones exists in the progression, and if the further zone exists then set the activation status to the activation status of the further zone and re-evaluate the detected ambient light to determine if it is or is not within the range of further zone, otherwise activate the light.

14. The system for controlling a light for a component of an electronic device as claimed in claim 13, further comprising a light sensor to provide signals for the detected ambient light.

15. The system for controlling a light for a component of an electronic device as claimed in claim 13, wherein:
the light is a backlight for the component; and
the component is a key cap for a key.

16. The system for controlling a light for a component of an electronic device as claimed in claim 15, wherein:
the light for the key cap is controlled separately from a second light for a display for the device.

17. The system for controlling a light for a component of an electronic device as claimed in claim 16, wherein:
one brightness evaluation zone of the plurality of brightness evaluation zones has an upper lux value of between approximately 50 and 300 lux and has an activation status for the light as "on"; and
an overlapping brightness evaluation zone to the one brightness evaluation zone in the plurality of brightness evaluation zones has a lower lux value of less than the upper lux value of the first brightness evaluation zone and has an activation status for the light as "off".

18. The system for controlling a light for a component of an electronic device as claimed in claim 16, wherein the module repeats its evaluation upon detection of a change in the ambient light level past a threshold or an activation of a light for a display of the device.

19. The system for controlling a light for a component of an electronic device as claimed in claim 16, wherein the electronic device is a portable electronic device.

* * * * *